(12) United States Patent
Jonsson

(10) Patent No.: US 6,439,056 B1
(45) Date of Patent: Aug. 27, 2002

(54) SENSOR ELEMENT HAVING TEMPERATURE MEASURING MEANS

(75) Inventor: Staffan Jonsson, Karlskoga (SE)

(73) Assignee: MKS Instruments, Andover, MD (US)

( * ) Notice: Subject to any disclaimer, the term of this patent is extended or adjusted under 35 U.S.C. 154(b) by 0 days.

(21) Appl. No.: 09/377,832

(22) Filed: Aug. 20, 1999

Related U.S. Application Data

(63) Continuation of application No. PCT/SE98/00303, filed on Feb. 20, 1998.

(30) Foreign Application Priority Data

Feb. 20, 1997 (SE) ................................................ 9700613

(51) Int. Cl.$^7$ .............................................. G01L 19/04
(52) U.S. Cl. ........................................................ 73/708
(58) Field of Search ......................... 73/708, 718, 724, 73/714; 361/283, 283.4

(56) References Cited

U.S. PATENT DOCUMENTS

| 4,011,901 A | 3/1977 | Flemings et al. |
| 4,141,252 A | 2/1979 | Lodge |
| 4,178,621 A | * 12/1979 | Simonelic et al. .......... 361/283 |
| 4,422,335 A | * 12/1983 | Ohnesorge et al. ........... 73/724 |
| 4,765,188 A | 8/1988 | Krechmery |
| 5,257,542 A | 11/1993 | Voss |
| 5,343,755 A | 9/1994 | Huss |

FOREIGN PATENT DOCUMENTS

| DE | 40 11 901 | 10/1991 |
| WO | WO 9528624 | 10/1995 |

* cited by examiner

Primary Examiner—William Oen
(74) Attorney, Agent, or Firm—Nixon & Vanderhye, P.C.

(57) ABSTRACT

A pressure sensor of substantially ceramic material comprises a rigid housing having a thick base plate, an interior shielding plate, and a movable diaphragm. A cavity providing a reference pressure is formed between the shielding plate and the diaphragm and on the opposite walls thereof are electrodes, which form a capacitor, the capacity of which is sensed. A temperature sensor comprises thermistors positioned inside the housing, between the base plate and the shielding plate, with the reference resistors on the surface of the base plate facing outwards. The shielding plate is thin, so that the thermistors are located near the diaphragm and are sensitive to the temperature thereof. Therefore the temperature sensor element has minimum influence on the electric properties of the pressure sensor and in particular on the mechanical properties of the diaphragm.

20 Claims, 6 Drawing Sheets

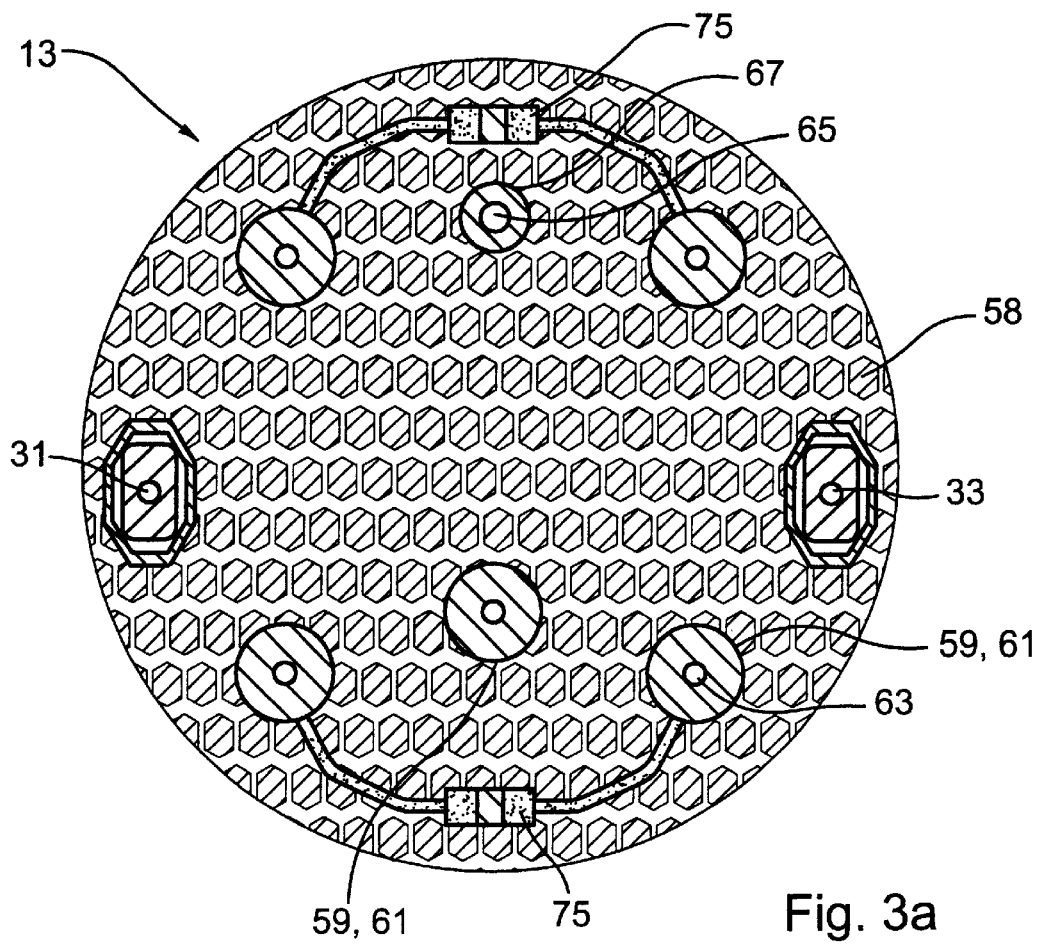
Fig. 3a
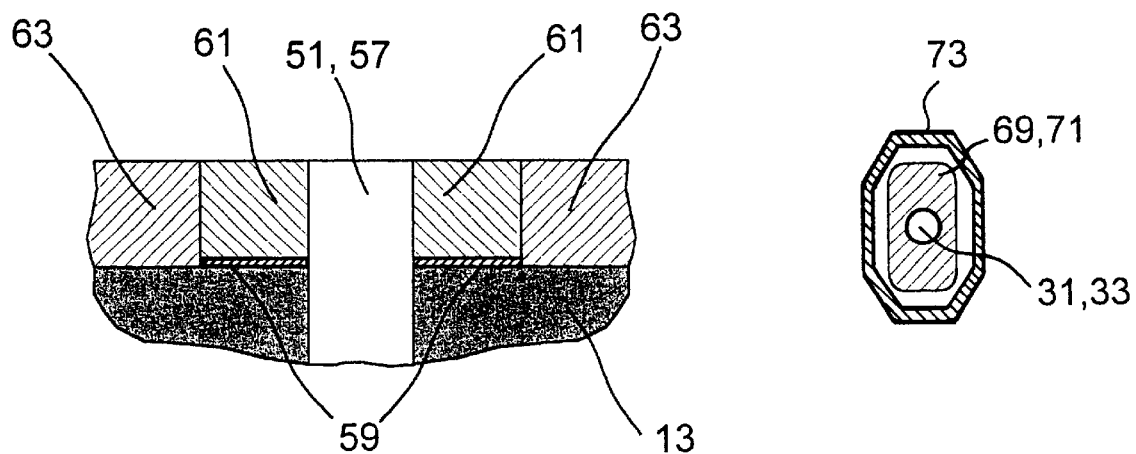
Fig. 3b
Fig. 3c

SENSOR ELEMENT HAVING TEMPERATURE MEASURING MEANS

This is a continuation of PCT application No. PCT/SE98/00303, filed Feb. 20, 1998, the entire content of which is hereby incorporated by reference in this application.

TECHNICAL FIELD

The present invention relates to a pressure sensor element comprising built-in temperature measuring means, in particular a ceramic capacitive pressure sensor element having capacitor electrodes on tile bottom side of a house part and on the top side of a diaphragm.

BACKGROUND

A ceramic capacitive sensor element 1 for sensing pressures is usually built of mainly two parts, see FIG. 9. These parts comprise a stable circular base plate 3 having a diameter of typically 20–30 mm and a thickness of typically 4–5 mm, also called a housing or house part, and a thinner circular plate 5, also called a diaphragm, applied to one of the large surfaces of the base plate 3 and joined thereto by means of for example glass joints 6 at its circular edge. The diaphragm 5 is attached so that its central portion can move, bend or be deflected in relation to the base plate, i.e., the basically flat shape of the diaphragm can change for varying pressures acting thereon. The diaphragm has the same diameter as the base plate and has a thickness, which is adapted to the magnitude of the load, i.e., the pressure, to which the diaphragm is intended to be subjected. The change of the position of the central portion of the diaphragm 5 is detected as a change of the capacitance between two parallel and opposite electrodes 7, 9 of, e.g., gold, which are applied by means of thin film methods on the central portions of the inner, opposite surfaces of the base plate 3 and the diaphragm 5 respectively. In the measurement of pressure the variable searched for is the pressure $P_{meas}$, which acts on the bottom, free surface of the diaphragm 5, and it is measured in relation to a reference pressure $P_{ref}$ acting on the inner surface of the diaphragm, i.e., the surface facing the base plate 3. Temperature measurement elements can be applied to the interior side of the diaphragm 5, see German publication document DE-A1 41 36 999. However, this involves a large disadvantage due to the fact that additional surface coatings on the diaphragm will always to some extent influence the mechanical characteristics of the diaphragm and in particular temperature induced movements in the diaphragm can increase. This can be particularly embarrassing when measuring using thin diaphragms.

SUMMARY

It is an object of the invention to provide a pressure sensor comprising integrated measurement of temperature and having a high accuracy and repeatability.

It is another object of the invention to provide a capacitive pressure sensor, which comprises temperature measurement elements which have a minimal influence of the mechanical characteristics of the measurement diaphragm and also on the electric fields at the capacitor electrodes of the pressure sensor.

The general problem solved by the invention is thus how to arrange temperature measurement means inside a compact ceramic pressure sensor of the capacitive type allowing an accurate temperature measurement at the place where it is needed, i.e. as near the capacitor electrodes as possible, and at the same time not interfering with the electric characteristics of the capacitor electrodes and not interfering with the movement of the measurement diaphragm.

The sensor element is designed to comprise an integrated temperature measurement bridge, which makes a compensation of the drift of the sensor element possible for a change of the ambient temperature and for temperature changes of the measurement medium. The signal from the measurement bridge can be processed digitally, what increases the applicability of the temperature measurement bridge. Resistive bridge elements of thin film type are coated on an interior surface inside a sensor housing comprising a thick base plate and a thin plate, the interior surface being located between the base plan and the thin plate, so that the bridge is separated from the measurement electrodes only by the relatively thin plate.

A pressure sensor of substantially ceramic material thus comprises a rigid and stable, non-deformable house part consisting of a thicker base plate and an interior shielding plate, and furthermore it comprises a diaphragm having a portion movable with the pressure which is to be sensed or measured. A cavity comprising a reference pressure is formed between the shielding plate and the diaphragm. On the opposite walls of the cavity electrodes are arranged, which form a capacitor, the capacity of which can be sensed by electronic circuits. A temperature sensor comprises a bridge circuit. This circuit includes thermistors arranged inside the house part, between the base plate and the shielding plate, and reference resistors on that surface of the base plate which faces outwards. The shielding plate is thin, e.g., having a thickness substantially between the thickness of the diaphragm and twice that thickness. Thereby the thermistors are located near the diaphragm and are sensitive to the temperature thereof. This position of the thermistors also results in that the temperature sensor elements, particularly the thermistors, give a minimum influence on the electric properties of the pressure sensor and in particular on the mechanical properties of the diaphragm.

Generally, a pressure sensor can comprise a pressure sensor house assembly made of substantially ceramic materials. The assembly comprises a substantially rigid house part having no movable portions and an at least partly movable diaphragm. A cavity is formed between the house part and the diaphragm. At least one temperature sensor or temperature sensing element is arranged in the interior of the house part, i.e inside the material of the house part. The temperature sensing element is thus not in contact with the exterior of the assembly and not in contact with the cavity. The temperature sensing element is preferably located at or very near the cavity and can be separated therefrom only by a ceramic plate. This ceramic plate is advantageously a thin plate, having a thickness substantially equal to the thickness of the diaphragm or at most equal to twice that thickness. Preferably, the temperature sensor is also located at the periphery of the house part in order not to interfere with electrical fields at central portions of the house part and the diaphragm.

The temperature sensing element can be arranged between a thicker base plate and a thinner shielding plate, the latter of which has a surface, which forms a wall in the cavity, wand in particular it can be arranged between an interior surface of the base plate and a joint, which attaches the base plate to the shielding plate An electrically conducting, shielding layer can be located between the base plate and the shielding plate and preferably centrally in the contact surface between the base plate and the shielding plate. Then the shielding layer and the temperature sensor may be located separately from each other, as seen in directions in the contact surface between the base plate and the shielding plate.

The area of an electrode, which is centrally located on the surface of the housing part at the cavity, may be somewhat smaller the e area of an opposite electrode, which is located centrally on the surface of the diaphragm at the cavity. An electrode, which is centrally located on the surface of the diaphragm at the cavity, is preferably surrounded by a substantially annular shielding layer made of an electrically conducting material.

The pressure sensor has typically the shape of a plate such as a substantially circular plate and then house part also has the shape of a plate with the same exterior form. Then two temperature sensor elements are advantageously arranged opposite each other along a diameter and symmetrically in the house part in relation to a central axis of the house part, the central axis being perpendicular to the large surface of the house part.

Furthermore, at least one reference resistor can be applied to or at an exterior surface of the house part. For a plate-shaped pressure sensor such as a substantially circular plate two reference resistances can be applied opposite each other along a diameter and symmetrically on or at the house part respectively in relation to a central axis of the house part.

Additional objects and advantages of the invention will be set forth in the description which follows, and in part will be obvious from the description, or may be learned by practice of the invention The objects and advantages of the invention may be realized and obtained by means of the methods, processes, instrumentalities and combinations particularly pointed out in the appended claims.

BRIEF DESCRIPTION OF THE DRAWINGS

While the novel features of the invention are set forth with particularly in the appended claims, a complete understanding of the invention, both as to organization and as content, and of the above and other features thereof may be gained from and the invention will be better appreciated from a consideration of the following detailed description of non-limiting embodiments presented hereinbelow with reference to the accompanying drawings, in which:

FIG. 3a is a view of the base plate in FIGS. 2a and 2b as seen from below, FIG. 3b is a partial section taken through the region at the mouth at a through-hole intended for electrical through-connections, FIG. 3c is a detail view of a contact area adjacent a through-hole for electrical trough-connections as seen in a direction perpendicular to the contact surface.

DETAILED DESCRIPTION

Figure 1A:
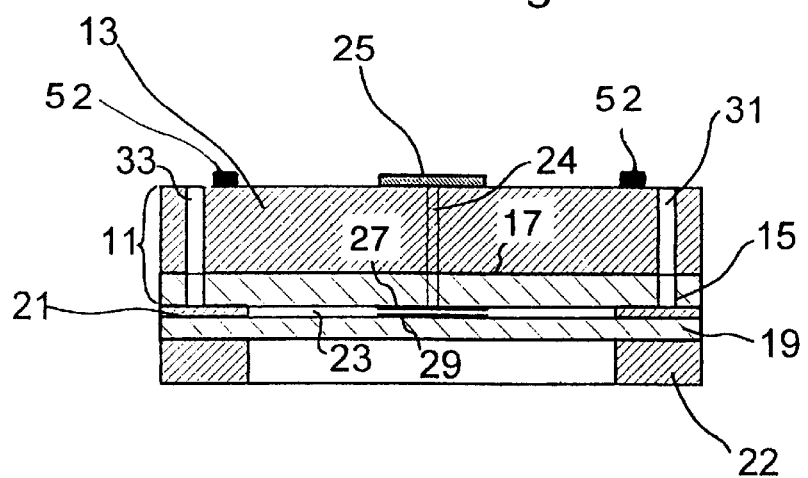
FIG. 1a is a sectional view of a pressure sensor element of the ceramic, capacitive type adapted to be provided with integrated, accurate temperature measuring means.
Figure 1B:
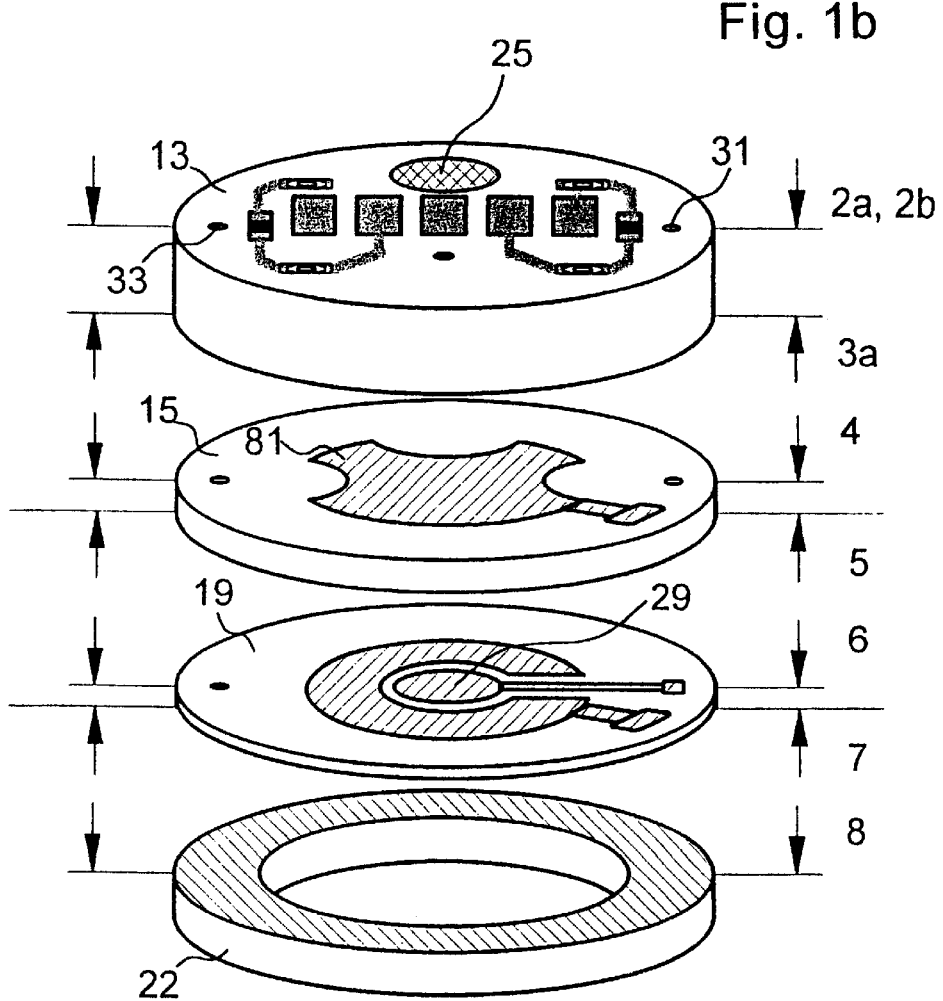
FIG. 1b is an exploded perspective view as seen obliquely from above of the pressure sensor element in FIG. 1 a comprising temperature measuring means.

In FIG. 1a a cross-sectional view and in FIG. 1b an exploded perspective view of a pressure sensor element are shown, which are generally constructed as is disclosed in the published International patent application WO 95/28624. The housing or house part 11 comprises here two ceramic parts, a thicker base plate 13 and thinner shielding plate 15. Between these parts an electrically conducting shielding layer 81 is arranged, i.e., at the inner bottom surface of the base plate 13 and at the top surface of the shielding plate 15. The ceramic diaphragm 19 is attached by means of a glass joint 21 at the opposite bottom surface of the shielding plate 15, which joint is annular and is located at the periphery of the opposite surfaces of the shielding plate 15 and the diaphragm 19. The glass joint 21 thus attaches the top surface of the diaphragm 19 to the bottom surface of the shielding plate 15 in a hermetic, helium impermeable and stable way. A stabilizing front ring 22 of ceramics is applied to the bottom surface of the diaphragm 19. The base plate 13, the shielding plate 15, the diaphragm 19 and the front ring 22 have all substantially the same outer diameter and the three first part are low circular-cylindrical bodies whereas the fourth component is a low, circular-cylindrical ring.

Between the bottom surface of the shielding plate 15 and the top surface of the diaphragm 19 a cavity 23 is formed owing to the glass joint 21, which is made so thick as to provide a distance between these surfaces. The cavity 23 has the shape of a very low cylinder, to which a channel 24 extends, see also FIGS. 3a, 4 and 5, up to the top surface of the base plate 13. This channel 24 is closed by a lid 25 inside which a getter body, not shown, is located, as is described in the simultaneously filed International patent application "A sensor element having an integrated reference pressure", so tat in the cavity 23 a very low reference pressure exists. Such a high quality integrated reference pressure increase the stability, the repeatability and the technical life-time of the sensor element and in particular this is true in the case where the diaphragm 19, which is used the pressure sensing element, is thin or very thin.

On the bottom side of the shielding plate 15 a top measurement electrode or capacitor electrode 27 is applied as a gold layer coated by means of thin film methods. The bottom measurement electrode or the capacitor electrode 29 is also made of gold and is in the same way coated on the top side of the diaphragm 19. The diameter of the top measurement electrode 27 is somewhat smaller than the diameter of the bottom measurement electrode 29, see FIGS. 5 and 6. Typically they can have diameters of 5.0 and 5.5 mm respectively. Channels 31, 33 are arranged for conducting electrical wires to the measurement electrodes 27, 29 and a channel for conducting electrical wires to an interior bottom shielding layer, see FIG. 6, which is coated on the top surface of the diaphragm 19. The channels 31, 33 extend through the base plate 13 and the shielding plate 15 perpendicularly to the large surfaces thereof and are located in the cylindrical ring region thereof which is located at their envelope surface and which corresponds to the glass joint 21 having a circular ring shape. These channels thus end at their lower end in the glass joint 21 and at their upper ends mouth at the top surface of the base plate 13 and at the top surface of the shielding plate 15 respectively. The glass joint 21 encloses but does not cover the contact surfaces of the electrical through-connections, as will be described hereinafter. Conductor paths of gold applied by means of thin film methods on the opposite surfaces of the shielding plate 15 and the diaphragm 19 extend from the measurement electrodes to the contact surfaces around the channels 31, 33 of the measurement electrode and are then partly covered by the glass joint material.

The construction of the different plates of the sensor element which are placed on top of each other to form a sensor element having integrated temperature measuring means will now be described in detail.

Figure 2A:
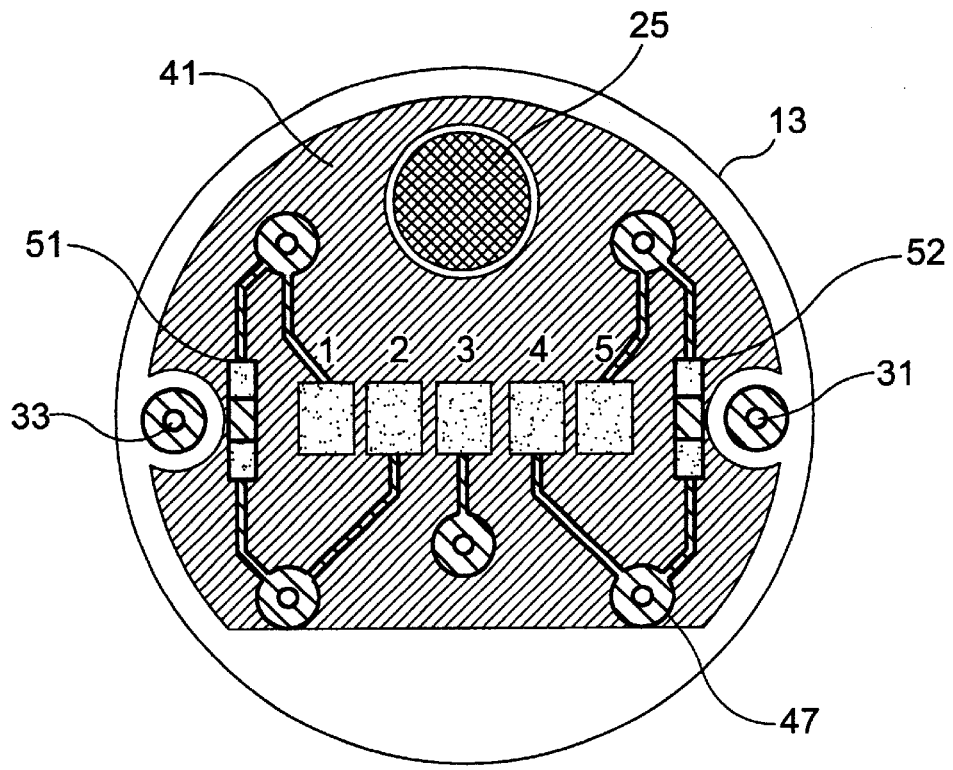
FIG. 2a is a view from above of a base plate included in the pressure sensor element having an applied protective film.
Figure 2B:
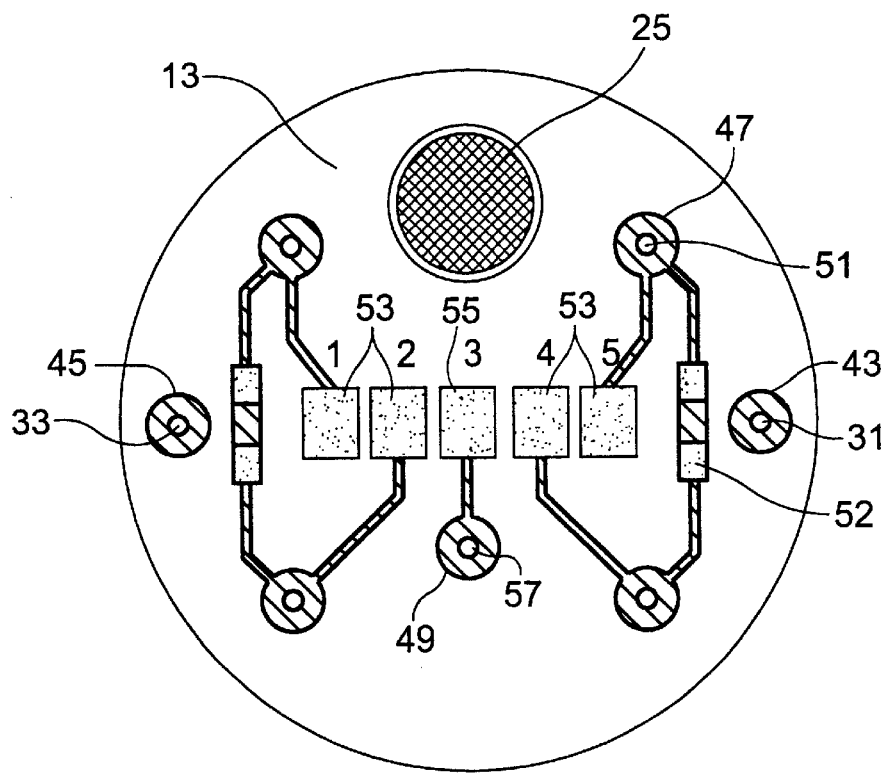
FIG. 2b is a view similar to FIG. 2a but without a protective film.

In FIG. 2a the base plate 13 is shown as seen from above comprising an electrically isolating protective film, which is applied to its top surface and which covers screen printed electrical conductor paths but has holes for the connection lid 25, for the electrical conductors to the electrodes and for electrical connections to the temperature measurement bridge and to interior shielding. Seven holes extending through the base plate 13 and having small diameters are arranged for these electrical conductors. Two of these holes are the upper portion or the mouths of the channels 31, 33, which extend to the measurement electrodes 27, 29. Around all these holes concentric circular ring shaped regions 43, 45, 47, and 49 are arranged comprising silver layers applied by means of thick film methods, see FIG. 2b, in which the base plate 13 is shown as seen from above without the protective film 41. Conducting shielded pins, not shown, are intended to be placed in the channels 31, 33 for the electrodes. Four through-holes 51 are arranged for electrical conductors comprising surrounding ring-shaped silver regions 47 to temperature sensitive elements, which are screen printed on the bottom side of the base plate 13, as will be described hereinafter in conjunction with FIG. 3a. In the holes for electrical conductors these conductors can be arranged in principle the same way, which is described in the International patent application WO 95/28624, cited above, see in particular the description of FIG. 4.

These temperature sensitive elements are together with two reference resistors 52 on the top surface of the base plate 13 components of a temperature measurement bridge. The legs of the measurement bridge are through, the screen printed conductor paths connected to rectangular solder areas 53 which are intended for exterior electrical connection and which are located along a diameter of the base plate 13. The screen printed conductors are in contact with the respective silver rings 47 located around the holes 51 for the conductors. Further out from the center, along the same diameter of the top surface of the base plate are the reference resistors 52 located. Centrally another rectangular solder area 55 is located, which through a screen printed electrically conducting line and the termination thereof at the circular silver ring 49 has contact with an electric conductor in the through-hole 57 to an inner shielding layer located on the top surface of the shielding plate 15 and the top surface of the diaphragm 19, see the detailed description of these plates hereinafter. At the same diameter and farthest out, near the periphery of the base plate 13, are the holes 31, 33 for the electrical conductor to the electrodes located.

The bottom surface of the base plate 13, see FIG. 3a, has a dotted pattern, the dots being configured as hexagons 58, made of some glass material suited for joining the plates. Around the holes 51, 57 for the electrical conductors to the temperature measurement bridge and interior shielding layer circular rings 59 of gold are coated as thin films, see the partial sectional view in FIG. 3b, which shows a cross-section of the region at the mouth of a hole 51, 57 at the bottom surface. On top of these circular rings 59 of gold circular rings 61 of silver having the same diameter are applied. The circular rings 59 of gold are thin films whereas the circular rings 61 of silver are thick films having a thickness, which is adapted, so that their surfaces, which are opposite the surfaces, which are in contact with the gold rings 59, are located in the same plane as or in the same level a the exterior surface (the bottom surface as seen in FIGS. 1a and 1b) of the glass joint material in the hexagons 58. Outside these circular rings of gold/silver surrounding circular rings 63 are arranged made of the same glass joint material as the dotted hexagon pattern 58 and having the same height as this. The channel 24 corresponds here to a through-hole 65 which has only a circular ring 67 of glass material around its mouth in the bottom surface of the base plate 13.

The glass, which is here used on the bottom surface of the base plate 13 in the hexagon pattern 58, can be another type than the glass material, which is coated on the bottom side of the shielding plate 15 and on the top surface of the front ring 22, compare the discussion hereinafter.

Around the channels 31, 33 extending to the measurement electrodes oblong gold/silver rings 69, 71 are arranged which have elongated shapes but otherwise are the same type as the gold/silver rings 59, 61 around the other holes 51, 57 for electric conductors. These oblong gold/silver rings 69, 71 act as contact points for pins for connection to the measurement electrodes, see FIG. 3c. Around these gold/silver rings 69, 71 oblong glass material rings 73 having an elongated shape are arranged.

Two thermistors 75 are applied as thin or thick film regions on the bottom surface of the base plate 13 directly on the ceramic surface thereof. Conductors of gold applied by means of thin film methods exend from the thermistors 75 to the contact surfaces, i.e., the silver rings 62, for the electrical through-connecting to the top surface of the base plate 13. The thin film conductors are applied directly to the ceramic surface and they are covered by the dotted glass pattern 58. The thermistors 75 are also surrounded by the dotted glass pattern 58. The thermistor material can be platinum or a PTC-material, which is compatible with the glass material. If the shielding plate 15 opposite the base plate 13 is thin, the thermistors 75 will be located in a direct vicinity of the diaphragm 19, the central portion of which is movable with the pressure, and still the thermistors are not applied to or located on or in the diaphragm. Elements applied to the diaphragm 19 can influence the central mechanical function of the diaphragm acting as an element having a portion which is movable with the exterior pressure. The thermistors 75 are located at the periphery of the bottom surface of the base plate 13, in parallel to the periphery and are located opposite each other at a diameter and at an angular distance of 90° from the reference resistors 52 on the top surface of the base plate 13.

Figure 4:
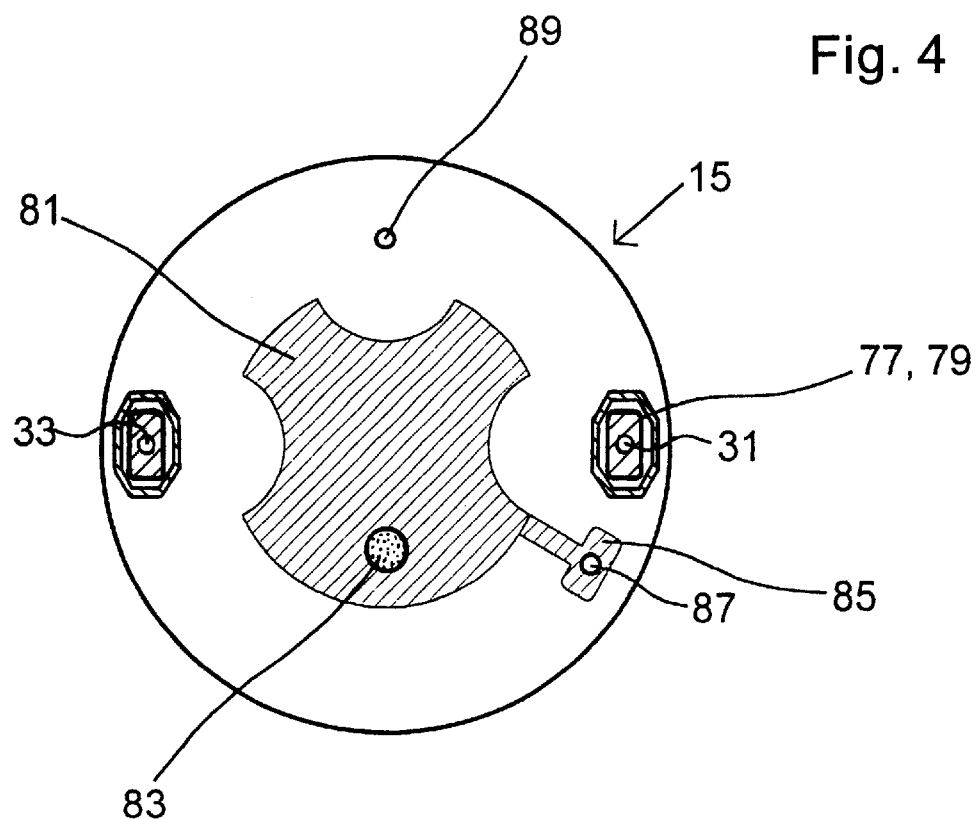
FIG. 4 is a view from above of a shielding plate included in the pressure sensor element.
Figure 5:
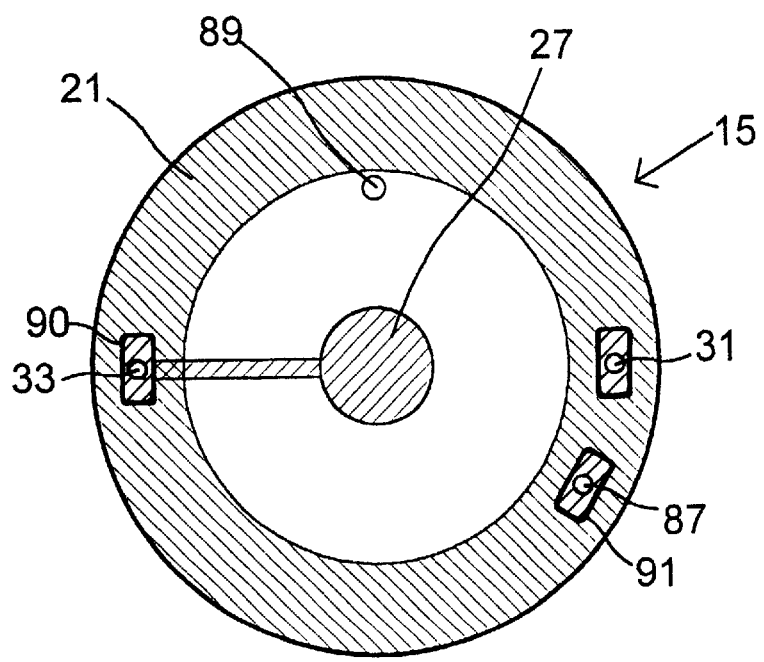
FIG. 5 is a view of the shielding plate in FIG. 4 as seen from below.

Against the bottom surface of the base plate 13 the top surface of the shielding plate 15 is located, see FIG. 4, It has two contact surfaces 77, 79 of gold/silver films for the pins, which are used for conducting the signal from the measurement electrodes. The contact surfaces 77, 79 can be made in principle in the same way as the contact surfaces 69, 71 at the corresponding holes 31, 33 on the bottom surface of the base plate 13. A screen printed gold surface 81 of gold coated by means of thin films methods on the top side of the shielding plate 15 forms an upper portion of the interior electrical shielding. On this top shielding layer 81 a contact surface 83 is arranged which is made of sliver applied by means of thick film methods and which is located, so that it is placed at the bottom mouth of the channel 57 through the base plate 13. The top shielding layer is along a radius prolonged by a conductor of gold, which extends to a contact area 85 located near the periphery of the late. This contact area 85 is by an electrical conductor in a through-hole 87 in the shielding plate connected to the bottom portion of the interior shielding, see more details hereinafter. The top shielding layer 81 has generally a circular shape comprising Free approximate semicircular cut-outs located in the two directions, in which the holes 31, 33 for the electrical conductors to the electrodes are located, and in the direction in which the channel 89, which is arranged for the channel 24 to the reference cavity and is a prolongation of the corresponding hole 65 in the base plate 13, start at the top surface of the shielding plate 15 in order to continue into the cavity 23 at the measurement electrodes. The cut-outs of the shielding layer 81 are like said holes located at an angular distance of 90° from each other. The main portion of the shielding layer 81, which as described has a generally circular shape, is located centrally on the top surface of the shielding plate 15, On the bottom surface of the shielding plate 15 the top measurement electrode 27 is applied and is made of gold applied by means of thin film methods, see FIG. 5. The holes 31, 33 for the electrical conductors to the top measurement electrode 27 and to the bottom measurement electrode applied to the top side of the diaphragm 19 and the hole 87 for electrical connection to the bottom portion of the interior shielding mouth at the bottom surface of the shielding plate in the glass joint 21, which forms a circular ring located at the periphery. The glass joint 21 encloses but does not cover the contact areas 90, 91 which are intended for the electrical conductors and are located around the holes 31, 33 and 87 respectively. An electrical conductor of gold applied by means of thin film methods extends from the top measurement electrode 27, which has the shape of a centrally located, circular region, up to the contact surface 90 surrounding the corresponding hole 33 for the electrical signal conductor through the plates. The gold conductor from the top measurement electrode 27 is covered by the glass joint within the region thereof at the periphery of the shielding plate 15.

Figure 6:
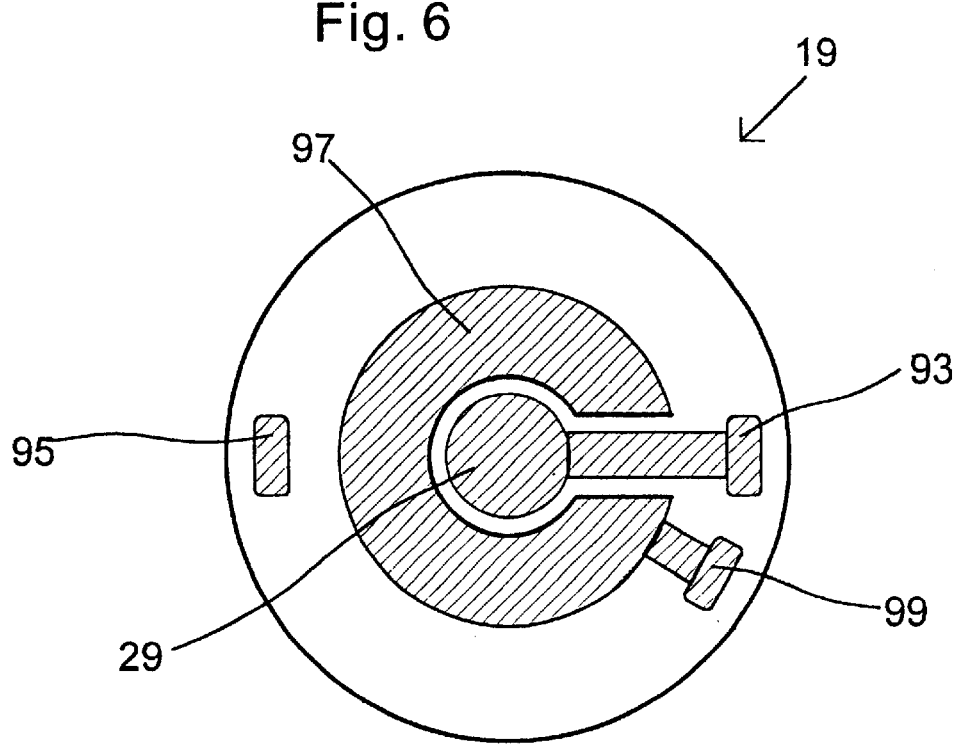
FIG. 6 is a view of a diaphragm included in the pressure sensor element as seen from above.

The surface located opposite and close to the bottom surface of the shielding plate 15 is the top surface of the diaphragm 19, see FIG. 6. The bottom measurement electrode 29, which also comprises a main portion having a centrally located circular shape, is made of gold applied by thin film methods and is prolonged by a radially extending electrical conductor. This radial conductor extends to an electrical contact surface 93, which is located under the hole 31 for the electrical connection through the plates to the bottom measurement electrode. A region 95 of gold applied by means of thin film methods is also provided on the corresponding place for the hole 33 for the top measurement electrode. The lower portion of the interior shielding is a an electrically conducting layer 97, which is located as a circular ring around the bottom measurement electrode 29, only interrupted for the conductor between the electrode and the contact area thereof, and which through a radial portion is prolonged up to a contact area 99, which is located under the hole 87 for the electrical connection from the top shielding layer 81 on the top surface of the shielding plate 15. The contact areas 93, 95, 99 on the top surface of the diaphragm 19 are thus located opposite contact surfaces on the bottom surface of the shielding plate 15.

Figure 7:
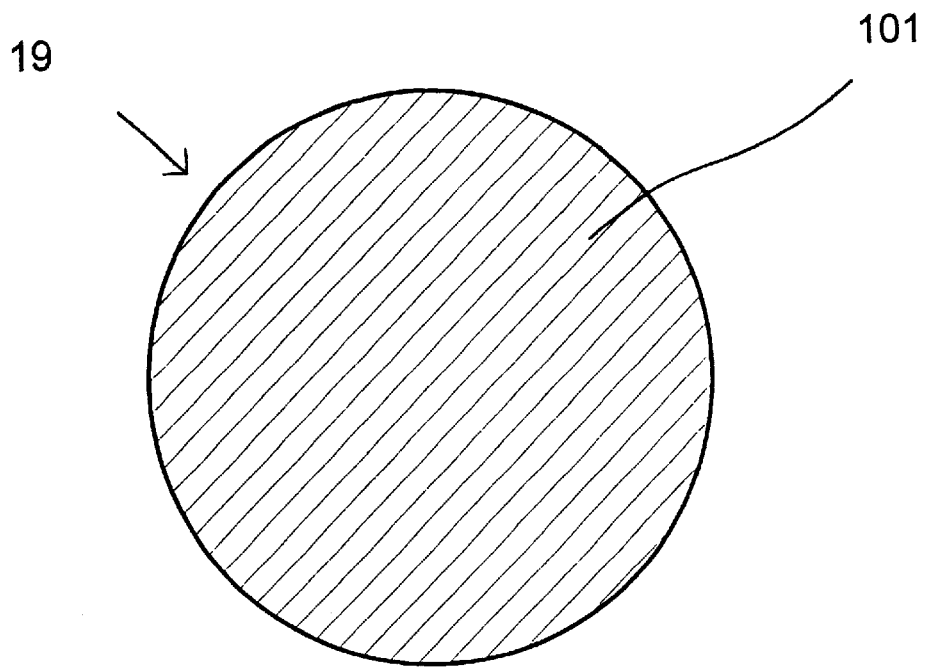
FIG. 7 is a view of the diaphragm in FIG. 6 as seen from below.
Figure 8:
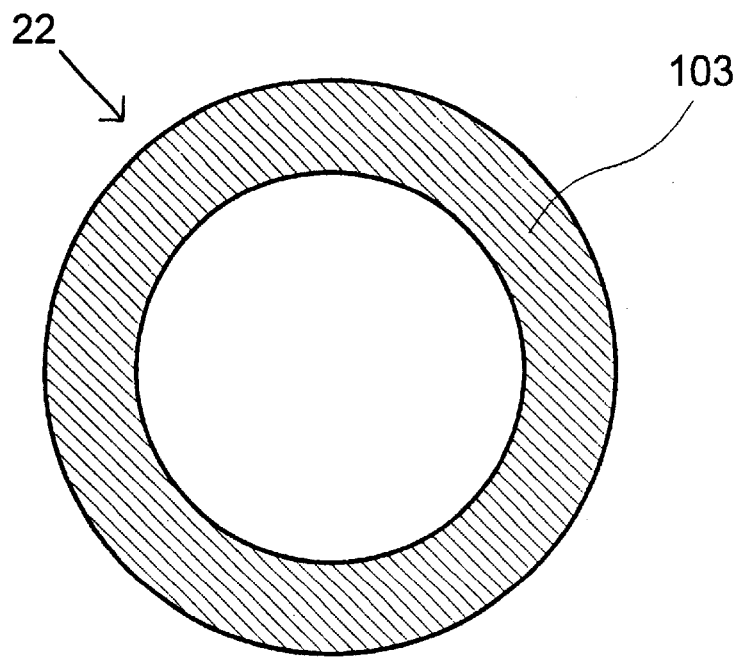
FIG. 8 is a view of a support ring included in the pressure sensor element as seen from above.
Figure 9:
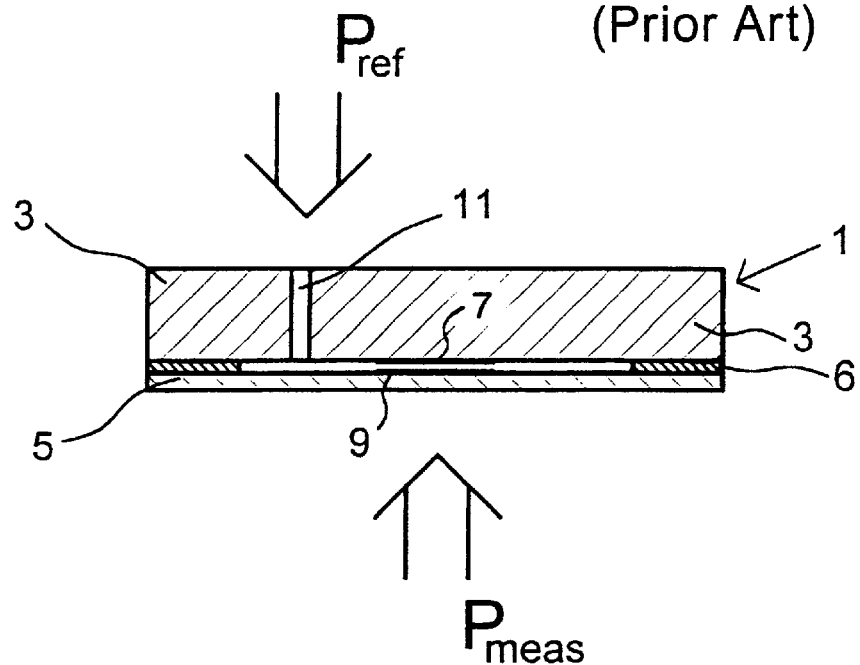
FIG. 9 is a sectional view of a prior an sensor element of ceramic, capacitive type

The bottom surface of the diaphragm 19, see FIG. 7, can be coated with a layer 101 of an electrically well conducing material, such as gold, covering the whole surface and applied by means of thin film methods. To the bottom side of the diaphragm a stabilizing front ring 22 or front plate can be applied, see the view of the top surface thereof in FIG. 8. The top surface of the front ring 22, which is engaged with the bottom surface of the diaphragm 19, is coated with glass joint material 103. It covers all of the circular ring surface of the front ring.

Thus a pressure sensor has been described having temperature measurement means allowing an accurate temperature measurement near the capacitor electrodes and not to any noticeable extent interfering with the electric fields of the capacitor electrodes and not interfering with the pressure-induced movements of the measurement diaphragm.

While specific embodiments of the invention have been illustrated and described herein, it is realized that numerous additional advantages, modifications and changes will readily occur to those skilled in the art. Therefore, the invention in its broader aspects is not limited to the specific details, representative devices and illustrated examples shown and described herein. Accordingly, various modifications may be made without departing from the spirit or scope of the general inventive concept as defined by the appended claims and their equivalents. It is therefore to be understood that the appended claims are intended to cover all such modifications and changes as fall within a true spirit and scope of the invention.

What is claimed is:

1. A pressure sensor comprising:

a pressure sensor housing assembly of substantially ceramic material, and including:

a substantially rigid housing part, an at least partly movable diaphragm attached to the housing, and a cavity formed between the substantially rigid housing part and the at least partly movable diaphragm, the substantially rigid housing part comprising a base plate and a shielding plate that is thinner than the base plate, the shielding plate having a surface which forms a wall in the cavity, at least one temperature sensor located between the base plate and the shielding plate and positioned so as to not to interfere with pressure sensing by electrodes in the cavity.

2. A pressure sensor comprising:

a pressure sensor housing assembly of substantially ceramic material, and including:

a substantially rigid housing part, an at least partly movable diaphragm attached to the housing, and a cavity formed between the substantially rigid house part and the at least partly movable diaphragm, the cavity containing pressure sensing electrodes, the substantially rigid housing part comprising a ceramic plate, at least one temperature sensor positioned in the interior of the substantially rigid housing part, separated from the cavity only by the ceramic plate, the ceramic plate being a thin plate having a thickness substantially equal to or larger than the thickness of the at least partly movable diaphragm and at most equal to twice the thickness of the at least partly movable diaphragm.

3. The pressure sensor of claim 2, wherein said ceramic plate separating the at least one temperature sensor from the cavity comprises a thin plate having a thickness substantially equal to or larger than the thickness of the at least partly movable diaphragm and at most equal to twice the thickness of the at least partly movable diaphragm.

4. The pressure sensor of claim 1, wherein the at least one temperature sensor is located at the periphery of said substantially rigid housing part and is positioned so as not to interfere with electrical fields at central portions of said substantially rigid housing part and the at least partly movable diaphragm.

5. The pressure sensor of claim 1, wherein said substantially rigid housing part comprises a thicker base plate and a thinner shielding plate, the thinner shielding plate having a surface, which forms a wall in the cavity, the at least one temperature sensor located between the thicker base plate and the thinner shielding plate.

6. The pressure sensor of claim 5, wherein said substantially rigid housing part comprises a joint attaching the thicker base plate to the thinner shielding plate, the at least one temperature sensor located between an interior surface of the thicker base plate and the joint.

7. The pressure sensor of claim 5, wherein said substantially rigid housing part comprises an electrically conducting, shielding layer located between the thicker base plate and the thinner shielding plate.

8. The pressure sensor of claim 7, wherein the shielding layer is located centrally in a contact surface between the thicker base plate and the thinner shielding plate.

9. The pressure sensor of claim 7, wherein the shielding layer and the at least one temperature sensor are located separately from each other as seen in directions in the contact surface between the thicker base plate and the thinner shielding plate.

10. The pressure sensor of claim 1, further comprising a first electrode centrally located on the surface of said housing part at the cavity, and a second electrode centrally located on the surface of the diaphragm at the cavity; and wherein the area of said first electrode is somewhat smaller than the area of said second electrode.

11. The pressure sensor of claim 1, further comprising an electrode centrally located on a surface of the at least partly movable diaphragm at the cavity and an annular shielding layer made of an electrically conducting material also located on the surface of the at least partly movable diaphragm, the annular shielding layer surrounding the electrode.

12. The pressure sensor of claim 1, wherein said substantially rigid housing part has the shape of a plate and comprises two temperature sensor elements positioned opposite each other along a diameter of and symmetrically in said substantially rigid housing part in relation to a central axis of said substantially rigid housing part.

13. The pressure sensor of claim 1, further comprising at least one reference resistor applied to or at an exterior surface of said substantially rigid housing part.

14. The pressure sensor of claim 13, wherein said substantially rigid housing part has the shape of a plate and comprises two reference resistances applied opposite each other along a diameter of and symmetrically on or at said substantially rigid housing part respectively in relation to a central axis of said substantially rigid housing part.

15. The pressure sensor of claim 12, wherein said substantially rigid housing part has the shape of a substantially circular plate.

16. The pressure sensor of claim 14, wherein said substantially rigid housing part has the shape of a substantially circular plate.

17. A pressure sensor, including a temperature sensor, comprising:
   a non-deformable housing comprising a base plate and a shielding plate that is thinner than the base plate;
   a diaphragm attached to the housing, the diaphragm including at least a portion movable with the pressure to be sensed;
   a cavity formed between the diaphragm and a first surface of the shielding plate;
   opposing electrodes formed on the diaphragm and the first surface forming a capacitor for sensing pressure; and
   a temperature sensor including first resistive elements positioned between the base plate and a second surface of the shielding plate and second resistive elements positioned on an outward surface of the base plate.

18. The pressure sensor of claim 17 wherein the temperature sensor is a bridge circuit, the first resistive elements are thermistors positioned on an inward surface of the base plate and the second resistive elements are reference resistors.

19. The pressure sensor of claim 18 further comprising an electrically conducting, shielding layer located between the base plate and shielding plate.

20. The pressure sensor of claim 18 wherein the thermistors are located at a periphery of the inward surface of the base plate and at an angular distance of 90° from the reference resistors on the outward surface of the base plate.

* * * * *